United States Patent
Purnadi et al.

(10) Patent No.: US 7,307,955 B2
(45) Date of Patent: Dec. 11, 2007

(54) METHOD AND EQUIPMENT FOR LOSSLESS PACKET DELIVERY TO A MOBILE TERMINAL DURING HANDOVER

(75) Inventors: Rene Purnadi, Coppell, TX (US); Srinivas Sreemanthula, Flower Mound, TX (US); Haihong Zheng, Coppell, TX (US); Khiem Le, Coppell, TX (US)

(73) Assignee: Nokia Corporation, Espoo (FI)

( * ) Notice: Subject to any disclaimer, the term of this patent is extended or adjusted under 35 U.S.C. 154(b) by 342 days.

(21) Appl. No.: 10/749,874

(22) Filed: Dec. 31, 2003

(65) Prior Publication Data
US 2005/0147042 A1    Jul. 7, 2005

(51) Int. Cl.
*H04J 1/16* (2006.01)
*H04J 3/14* (2006.01)

(52) U.S. Cl. .................. 370/235; 370/326; 370/428; 370/469

(58) Field of Classification Search ........ 370/229–236, 370/412, 328–333, 428–429, 466–469
See application file for complete search history.

(56) References Cited

U.S. PATENT DOCUMENTS

| | | | |
|---|---|---|---|
| 6,424,625 B1 * | 7/2002 | Larsson et al. | 370/236 |
| 6,490,251 B2 * | 12/2002 | Yin et al. | 370/236.1 |
| 6,542,490 B1 * | 4/2003 | Ahmadvand et al. | 370/338 |
| 6,556,556 B1 * | 4/2003 | Sen et al. | 370/342 |
| 6,621,796 B1 * | 9/2003 | Miklos | 370/236 |
| 6,804,202 B1 * | 10/2004 | Hwang | 370/282 |
| 6,816,471 B1 * | 11/2004 | Ludwig et al. | 370/331 |

OTHER PUBLICATIONS

3GPP TS 25.322 V5.6.0 (Sep. 2003), Technical Specification, 3rd Generation Partnership Project; Technical Specification Group Radio Access Network; Radio Link Control (RLC) protocol specification (Release 5), 20 pgs., (as published on the Internet), Sep. 2003.

* cited by examiner

*Primary Examiner*—Joseph Feild
*Assistant Examiner*—Inder Pal Mehra
(74) *Attorney, Agent, or Firm*—Ware, Fressola, Van Der Sluys & Adolphson LLP

(57) ABSTRACT

A "loose ACK" method by which a radio access network of a cellular network monitors wireless transmission of packets according to a layered protocol including a radio layer (near the physical layer) and an upper layer, the method including: a step (23) of slow release—in what is called normal buffer management—in which the upper layer removes from a buffer maintained by the upper layer the oldest packet in the buffer when the buffer is full and a new packet arrives, and does so independently of whether the packet being removed has been acknowledged by the radio layer of the terminal; and a step (24) of local acknowledgement in which the radio layer sends an acknowledgement to the upper layer on the occurrence of a predetermined event. The local acknowledgement can trigger either special mode buffer management or release of the buffer to a target (entity or layer).

28 Claims, 4 Drawing Sheets

METHOD AND EQUIPMENT FOR LOSSLESS PACKET DELIVERY TO A MOBILE TERMINAL DURING HANDOVER

TECHNICAL FIELD

The present invention pertains to the field of communication of packets/radio frames in a cellular communication system. More particularly, the present invention pertains to such communication during a handover process.

BACKGROUND

Radio frames (also called packets) in a buffer in a mobile phone are transferred from the mobile terminal to the target Access Point (AP), called more often a Node B in 3G, an Access Point in Wireless LAN, and in 2G more often called the Base Transceiver Station. The buffer is maintained by a radio (protocol) layer. It holds all unacknowledged radio frames, whether transmitted or not. When the target AP signals an ACK for a radio frame, the radio layer relays the ACK to an upper layer of the radio protocol, and removes the radio frame from the buffer.

In many radio communication systems of today, a radio layer uses an automatic repeat request (ARQ) method to ensure that transmitted radio frames have been received by the receiving end, i.e. if a radio frame is not acknowledged it is automatically (without a repeat request having been made) re-transmitted. The radio layer therefore maintains the above-mentioned buffer for holding radio frames until they are acknowledged.

Higher data rates envisioned in future wireless technologies impose heavier buffering requirements on the radio layer. In addition, radio frames are radio technology specific (in a multiple radio technology environment), and may be adapted to best suit current radio link conditions, which potentially makes the radio frames in the radio layer between the source and target AP incompatible. Therefore, it would be beneficial to have the buffer maintained not in the radio layer, but in some upper protocol layer, where the data units being transmitted can (and typically do) exist as radio technology independent packets. Further motivating such a change is the observation that upper layer handover occurs less often than radio layer handover, so that it would be necessary to transfer the buffer less often if maintained by an upper layer.

Cellular/wireless handover procedures cause a break in communication sometimes leading to loss of data. In order to minimize or prevent data losses in providing communication for a mobile during a handover, an operator network must know the most recent data that was successfully transmitted to the mobile so that any lost packets can be retransmitted. Although as described above it is beneficial to have buffering at an upper layer, on the other hand to ensure lossless handover one would need an ACK-based scheme between the radio layer and the upper layer. The upper layer would buffer a packet and remove it only when it received a local ACK (an ACK from the radio layer to the upper layer). But the use of a tight local ACK procedure (i.e. one in which every packet must be ACK-ed) would add significant overload to the network and would lead to inefficiency, especially at the higher data rates envisioned in the future.

The invention introduces the use of what is here called a "loose" ACK scheme as a way to provide a lossless handover procedure. In contrast to the prior art—current radio technology uses radio layer buffering (after segmentation and concatenation), e.g. as explained in 3GPP TS 25.322—the loose ACK scheme provided by the invention does not require a tight local ACK procedure (in which the radio layer signals ACKs to the upper layer for each successfully transmitted packet). The loose ACK scheme of the invention is also of use in support of lossless packet delivery during poor radio conditions.

DISCLOSURE OF THE INVENTION

In a first aspect of the invention, a method is provided by which a radio access network coupled to a core network monitors wireless transmission of packets according to a layered protocol, the radio access network including equipment implementing a radio layer and an upper layer of the layered protocol, the radio layer and the upper layer distinguished at least in that the radio layer receives data as packets from the upper layer and prepares the data for transmission over the air by forming radio frames corresponding to the packets, the method characterized by: a step of slow release in which the upper layer removes from a buffer maintained by the upper layer the oldest packet in the buffer when the buffer is full and a new packet arrives, and does so independently of whether the oldest packet has been acknowledged by the radio layer of the terminal; and a step of local acknowledgement in which the radio layer sends a local acknowledgement to the upper layer on the occurrence of a predetermined event.

In accord with the first aspect of the invention, in the step of local acknowledgement, the radio layer may include with the local acknowledgement a sequence number. Further, the upper layer may remove the packet in the buffer having a sequence number equal to the sequence number included with the local acknowledgement, and also removes all older packets in the buffer.

Also in accord with the first aspect of the invention, the step of local acknowledgment may trigger special mode buffer management by the upper layer in which the step of slow release is at least temporarily discontinued and steps are performed in which packets are instead removed by the upper layer whenever a subsequent local acknowledgement is received along with a sequence number, the upper layer then removing the packet with the sequence number accompanying the local acknowledgement as well as all older packets. Further, the method may also include a step of returning to a normal-mode buffer management upon receiving a trigger-to-normal-mode local acknowledgment. Further still, the trigger-to-normal-mode local acknowledgment may be identified as such by the upper layer on the basis of whether or not it includes a sequence number. Alternatively, the trigger-to-normal-mode local acknowledgment may be identified as such by the upper layer on the basis of whether or not a flag it includes is set, and in addition, the local acknowledgment may or may not include a sequence number, and, in addition, if a sequence number is included, it may serve as a signal to the upper layer to remove the packet with the sequence number as well as all older packets. Also alternatively, the trigger-to-normal-mode local acknowledgment may identified as such by the upper layer on the basis of whether or not it is a different type of message than the local acknowledgment triggering special mode buffer management, and as in the case of including a flag, a sequence number may or may not be included and if so, may serve in the same way as in the case of including a flag. Further, the upper layer may not remove packets from the buffer while in special mode unless the buffer is full; the upper layer may use a larger buffer while in special mode; and the local acknowledgement triggering special mode may be included with a handover trigger message.

Also in accord with the first aspect of the invention, the step of local acknowledgement may signal to the upper layer a release to a target of the buffer instead of signaling special mode buffer management by the upper layer.

In a second aspect of the invention, a computer program product is provided comprising: a computer readable storage structure embodying computer program code thereon for execution by one or more computer processors in a radio access network, with said computer program code characterized in that it includes instructions for performing the steps of a method according to the first aspect of the invention.

In a third aspect of the invention, a radio access network is provided comprising equipment adapted to perform a method according to the first aspect of the invention.

In a fourth aspect of the invention, a radio access network is coupled to a core network of a wireless communication system, the radio access network comprising elements for use in monitoring wireless transmission of packets according to a layered protocol, the elements including equipment implementing a radio layer and an upper layer of the layered protocol, the radio layer and the upper layer distinguished at least in that the radio layer receives data as packets from the upper layer and prepares the data for transmission over the air by forming radio frames corresponding to the packets, the radio access network characterized in that: the upper layer performs buffer management according to either a normal mode or a special mode and in the normal mode the upper layer performs a slow release procedure in which it removes from a buffer it maintains the oldest packet in the buffer when the buffer is full and a new packet arrives, and does so independently of whether the oldest packet has been acknowledged by the radio layer of the terminal; and the radio layer triggers the upper layer to perform buffer management according to the special mode by sending a local acknowledgment to the upper layer on the occurrence of a predetermined event.

In accord with the fourth aspect of the invention, in triggering buffer management according to the special mode, the radio layer may include with the local acknowledgement a sequence number.

Also in accord with the fourth aspect of the invention, in special mode the upper layer at least temporarily may discontinue the slow release procedure and instead removes packets from the buffer whenever a subsequent local acknowledgement is received along with a sequence number, the upper layer then removing the packet with the sequence number accompanying the local acknowledgement as well as all older packets. Further, the radio layer may trigger the upper layer to return to normal mode by providing to the upper layer a trigger-to-normal-mode local acknowledgment.

Also in accord with the fourth aspect of the invention, upon receiving the local acknowledgement, the upper layer may release the buffer to a target entity instead of performing buffer management according to the special mode.

In a fifth aspect of the invention, a wireless communication system is provided, comprising a core network, a terminal, and a radio access network according to the second or third aspect of the invention and communicatively coupling the terminal to the core network.

BRIEF DESCRIPTION OF THE DRAWINGS

The above and other objects, features and advantages of the invention will become apparent from a consideration of the subsequent detailed description presented in connection with accompanying drawings, in which:

FIG. 3 a flow chart illustrating messaging according to the "loose ACK" procedure provided by the invention for monitoring packet transmission.

DETAILED DESCRIPTION OF THE INVENTION

The invention has to do with signalling between two protocol layers—an upper layer and a lower/radio layer—existing in a same entity (an access point or Node B) of a radio access network, or in different entities of a radio access network, such as (the radio layer in) a Node B and (the upper layer in) a Radio Network Controller (RNC) in the case of 3G, and introduces use of a reduced local acknowledgement (ACK) mechanism—called here "loose ACK"—by which the upper layer is able to monitor transmission (over the air) of packets via the radio layer (which transmits packets as one or more radio frames via the physical layer). The upper layer, according to the invention, maintains a buffer of packets as described below, in case a packet and must be retransmitted (because it is lost or otherwise not successfully communicated). Packets are removed from the buffer according to the loose ACK mechanism, as described below. As part of the loose ACK, the invention uses sequence numbers corresponding to packets provided by the upper layer to the radio layer. The radio layer communicates a packet as one or more radio frames, and so associates one or more radio frames with a sequence number created by the upper layer.

Figure 1:
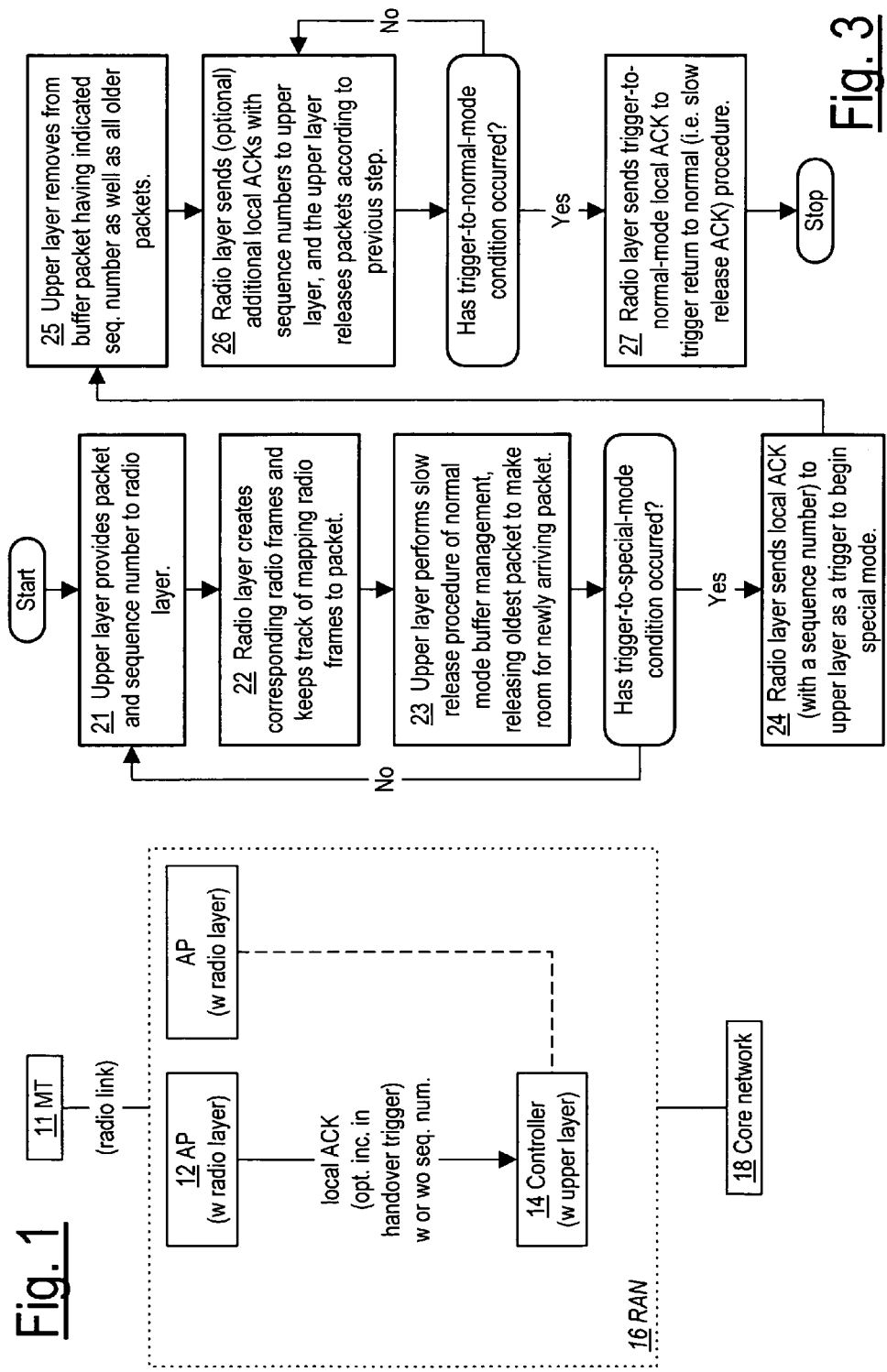
FIG. 1 is a block diagram/flow diagram illustrating entities of a cellular network involved in monitoring packet transmission, according to the invention.

Referring now to FIG. 1, a radio access network 16 coupled to a core network 18 of a cellular network includes: an access point 12 (such as a Node B in 3G, an Access Point in Wireless LAN, or a base station in 2G) having a radio link to a mobile terminal 11; and also a controller 14 (such as a radio network controller in 3G, an Access Point in Wireless LAN, or a base station controller in 2G). The radio layer exists in the access point 12, and depending on the cellular network, the upper layer resides in the controller 14, although it is possible that it also resides in the access point 12. The ACK of the invention is here referred to as "local ACK" because it is ACK signalling between two protocol layers that can exist in the same device—the access point 12, depending on the release of the radio access network—or can exist in an access point 12 and its (serving) controller 14.

The local ACK and the sequence numbers are provided (together) either in a standalone message or embedded in another message, e.g. as part of handover signaling.

Figure 2:
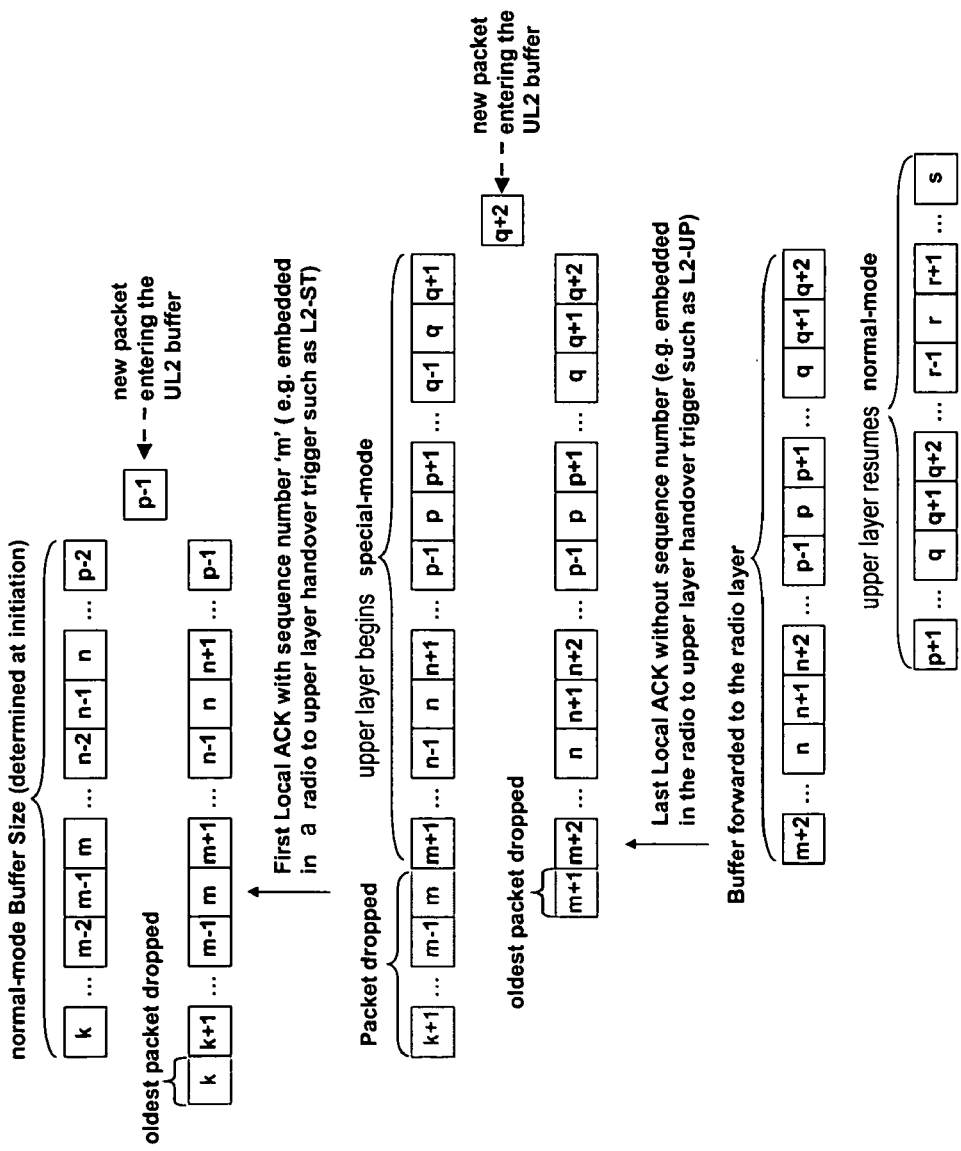
FIG. 2 is a schematic illustrating the slow release procedure provided as part of the loose ACK of the invention, along with other signalling according to the loose ACK of the invention.

Referring now to FIG. 2, in the loose ACK scheme provided by the invention, the radio layer does not send a local ACK to the upper layer every time a packet has been successfully transmitted. When the buffer maintained by the upper layer is full, the upper layer drops the oldest packet from the buffer in order to accept a new packet, in what might be characterized as a "slow release" scheme. Such a scheme therefore keeps a packet in the upper layer buffer as long as possible, and yet helps to reduce the end-to-end re-sending of packets since in at least some instances, if a packet is lost on the radio link, it will still exist in the upper layer buffer and can be retransmitted without having to request the original sender to resend.

According to the invention and still referring to FIG. 2, a first local ACK is sent only when a certain event happens, such as when the radio link condition (e.g. as reflected through the error rate or the retransmission rate) degrades below a predetermined threshold (according to some metric such as error rate), or during a handover procedure. For example, when the radio layer decides that a handover is required, it may send a trigger to the upper layer to prepare the handover. If so, then according to the invention the trigger includes a local ACK along with a sequence number, which initiates what is here called "upper layer special mode buffer management" by the upper layer. The sequence number may represent the last packet that has been successfully transmitted over the radio interface. When the upper layer receives the local ACK and sequence number, it removes from the buffer the packet indicated by the sequence number and also all preceding packets (i.e. packets provided to the radio layer before the packet with the indicated sequence number).

In the special-mode buffer management of the invention, the frequency of the local ACK from the radio layer to the upper layer can vary. The local ACK can be sent for each packet that has been successfully transmitted or it may be sent only on the occurrence of one or another predetermined event. For example, when the radio layer detects that the radio link has been disconnected after a handover command has been issued, the radio layer can send a trigger to the upper layer to execute the handover (e.g. to stop delivering the packet to the source, to release the buffer to the target upper layer, etc.), and this trigger can include a local ACK with a new sequence number, so that the packet indicated by the sequence number and all preceding packets can be eliminated from the buffer. (When the upper layer gives a packet to the radio layer, according to the invention it includes a sequence number. The radio layer may 'chop' the packet into one or more radio frames, and it is the radio layer's responsibility to map the resulting radio frames to the upper layer packet.)

In some embodiments, even in special mode, the upper layer does not remove any packets unless the buffer is full. Also in some embodiments, the upper layer may optionally increase the buffer size when entering special mode (and then decrease the buffer size to a standard normal mode size when leaving special mode).

Now further according to the invention and still referring to FIG. 2, in order to trigger the upper layer to terminate special mode and return to normal-mode buffer management, the radio layer sends another, triggering local ACK. In order to indicate that the local ACK is being used as a trigger to terminate special mode, it is distinguished from non-triggering local ACKs in different ways, depending on the embodiment. In one embodiment, the local ACK does not contain a sequence number (the absence of a sequence number distinguishing it from non-triggering local ACKs). In another embodiment, the local ACKs include a flag and it is set when providing a triggering local ACK. In yet another embodiment, the local ACK is a different message type/format. In the latter two embodiments, the triggering local ACK may carry a sequence number representing the last packet that has been successfully sent over the radio, and as usual, the sequence number is used by the upper layer to remove the packet and the preceding ones from its buffer. Triggering to return to normal mode is done when for example the radio link condition improves to above a predetermined threshold (based e.g. on error rate or retransmission rate) or when a handover is completed, i.e. when the radio layer detects that a new radio link has been established.

Thus, with the loose ACK scheme per the invention, normal-mode and special-mode buffer management are provided, and in the normal-mode buffer management, no local ACK from the radio layer to upper layer is required. Instead, the upper layer uses the slow release scheme to eliminate packets from its buffer. In special-mode, however, when the radio layer does send an ACK to the upper layer (with a sequence number), the single ACK can result in the upper layer removing many packets from its buffer. Further, because the buffering provided by the invention is the buffering of packets, as opposed to radio frames, the buffering is radio-technology independent. For example, the buffering of the invention can be buffering of packets per IP or MPLS—Multiprotocol Label Switching or any other protocol.

Referring now to FIG. 3, a method (i.e. one embodiment) according to the invention is shown as including a first step 21 in which the upper layer 14 provides a packet and a corresponding sequence number to the radio layer 12. In a next step 22, the radio layer creates corresponding radio frames and keeps track of mapping the radio frames to the packet. In a next step 23, the upper layer performs the slow release procedure of normal mode buffer management according to the invention, releasing the oldest packet to make room for a newly arriving packet. In a next step 24, executed after a trigger-to-special-mode condition has occurred, the radio layer sends a local ACK (with a sequence number) to the upper layer in order to trigger special mode buffer management. In a next step 25, the upper layer removes from its buffer the packet having the sequence number included in the local ACK, as well as all older packets. In a next step 26, the radio layer sends (optionally, as needed) additional local ACKs with sequence numbers to the upper layer, and the upper layer removes packets according to the previous step, i.e. the packet having the indicated sequence number and all older packets. In a next step 27, after a trigger-to-normal-mode condition has occurred, the radio layer sends to the upper layer a trigger-to-normal-mode local ACK in order to cause the upper layer to resume normal mode buffer management according to the invention as described above (i.e. using slow release).

Figure 4:
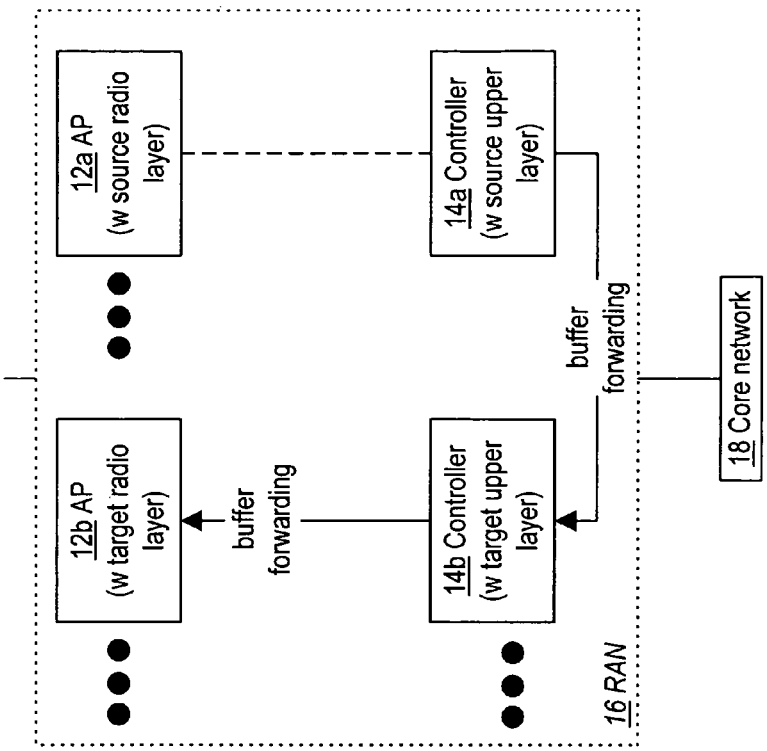
FIG. 4 is a block diagram/flow diagram illustrating signalling according to the invention in case of an intra-upper-layer handover.
Figure 5:
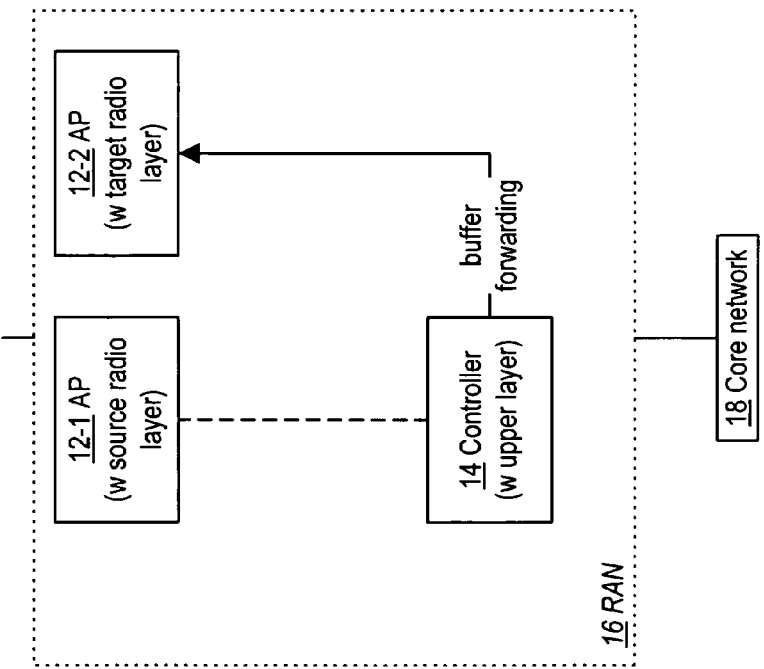
FIG. 5 is a block diagram/flow diagram illustrating signalling according to the invention in case of an inter-upper-layer handover.

Referring now to FIGS. 4 and 5, in some handover procedures in some cellular systems, only one local ACK can be provided—the final local ACK, with or without a sequence number (depending on the embodiment). For example, in a forward handover, only one local ACK can be sent to the upper layer trigger in a target entity. FIG. 4 shows an intra-upper layer handover from a first AP 12-1 served by a controller 14 to a second AP 12-2 served by the same controller, and the trigger prompts the release of the upper layer buffer to the second AP 12-2, i.e. the upper layer in the controller 14 communicates to the second AP 12-2 the content of the upper layer (including the packets that are not successfully sent over the radio interface between MT and 12-1 AP). If sequence number representing the packets that are successfully transmitted over the radio interface is carried in the local ACK, the upper layer can remove the packet and all the preceding packets from its buffer before releasing the rest of them to the second AP 12-2. FIG. 5 shows an inter-upper layer handover, from a first AP 12a served by a first controller 14a to a second AP 12b served by a second controller 14b. The trigger in this case triggers the target upper layer (in the second controller 14b) to pull the buffer from the source upper layer (in the first controller 14a).

Thus, in situations where only a single local ACK is being provided, the local ACK does not indicate that the buffer management should enter special mode, but is instead used only to indicate that the upper layer buffer is to release the (entire) upper layer buffer (to the target BTS or AP in case of a forward handover, or to the upper layer of the target in case of an inter-upper layer handover). If the sequence number is carried in the local ACK, the upper layer may remove the packets represented by the sequence number and all the preceding packets before releasing the upper layer buffer. (In some cellular system, the MT in effect grabs a target BTS or AP that has a better radio condition without notifying its previous serving BTS or AP. So the previous BTS need never go to special mode. When the MT grabs the target BTS or AP, the target BTS or AP sends an indication to the upper layer in the previous BTS or AP to release or send the upper layer buffer maintained there to the target BTS or AP.) The upper layer knows whether a local ACK is being used to trigger special mode or terminate special mode or do a handover based on its present state—i.e. whether it is in special mode or not—and based on, e.g. whether there is a sequence number included with the local ACK or whether a mode-switching-flag is indicated in the local ACK.

The size of the upper layer buffer can be adapted to many parameters, such as the bandwidth the MT is using or the subscriber class.

The local ACK (with or without a sequence number) can be sent in a separate message or can be embedded in a radio to upper layer trigger (for a handover, for example) in the source AP (access point, i.e. Node B in 3G) or BTS (base transceiver station, the AP in 2G) when for example a handover is imminent.

Figure 6:
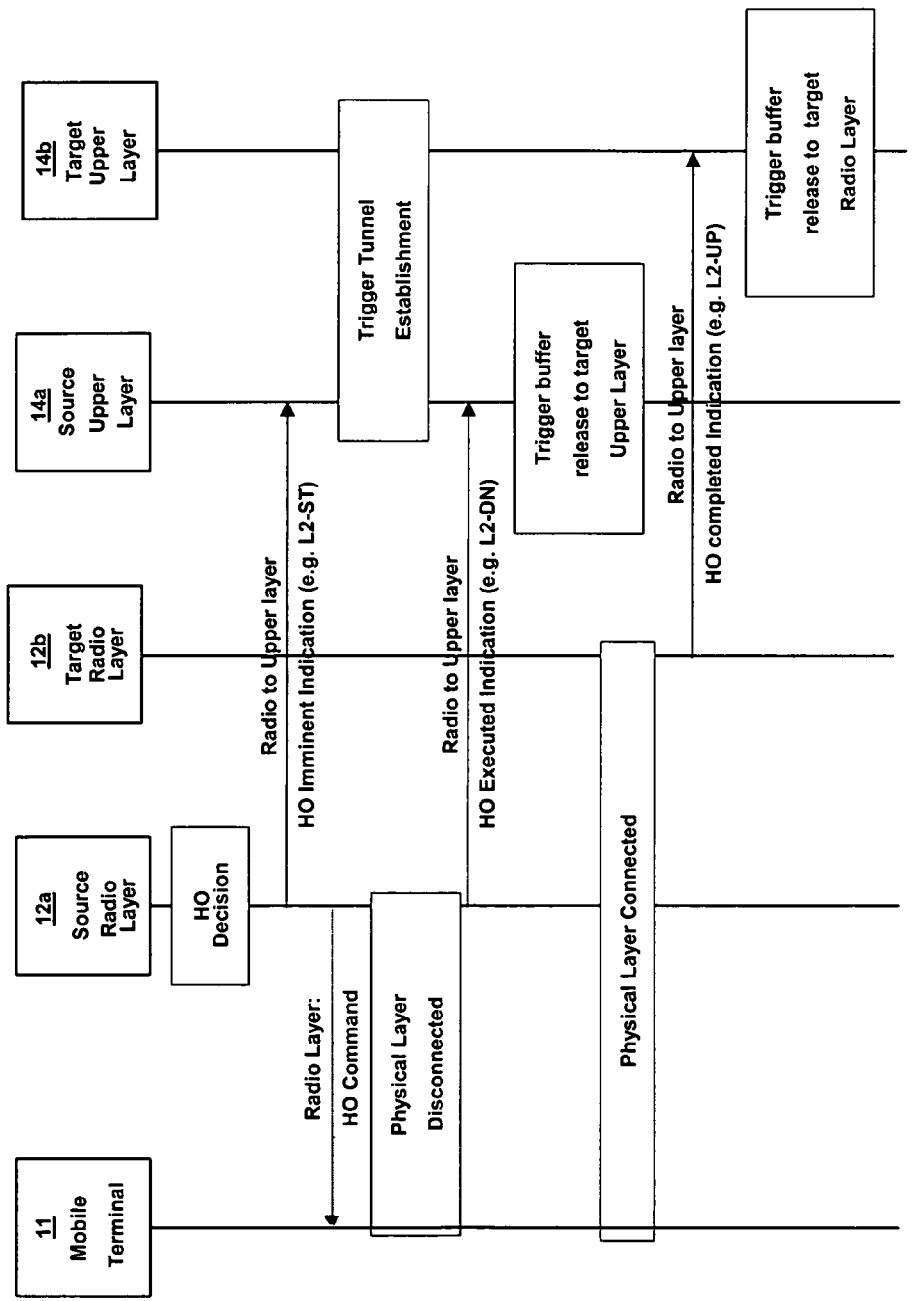
FIG. 6 is a message sequence diagram illustrating the signalling according to the invention in case of an inter-upper-layer handover.

Referring now to FIG. 6, a handover imminent indication can be used to send the first local ACK (accompanied by a sequence number) to trigger special-mode upper layer buffer management. During the special-mode buffer management, the radio layer can send additional local ACKs (each with a sequence number) such as in a message indicating a handover has been executed (e.g. L2-DN). The last local ACK—without a sequence number—is piggy-backed in a handover-completed indication (e.g. L2-UP) to trigger the upper layer to terminate special mode buffer management and return to normal mode.

The invention is thus a method for use by a radio access network in monitoring transmission of packets, and also a corresponding radio access network, i.e. one with equipment adapted to perform the above described method of "loose ACK." In addition, the invention can be provided as software or firmware with instructions corresponding to the above-described method for execution by a processor or processors in a radio access network. More specifically, the invention can be provided as a computer program product including a computer readable storage structure embodying computer program code—i.e. the software or firmware—thereon for execution by a computer processor or processors in a radio access network.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A method, comprising:
an upper layer of a communication protocol for wireless communication of packets performing a slow release in which the upper layer removes from a buffer maintained by the upper layer the oldest packet in the buffer when the buffer is full and a new packet arrives, and does so independently of whether the oldest packet has been acknowledged by a radio layer that receives data as packets from the upper layer and prepares the packets for wireless transmission; and
the radio layer performing a local acknowledgement in which the radio layer sends a local acknowledgement to the upper layer on the occurrence of a predetermined event, the local acknowledgement indicating to the upper layer that the radio layer has received from a peer radio layer an acknowledgement that a packet has been successfully transmitted.

2. A method as in claim 1, wherein in performing the local acknowledgement, the radio layer includes with the local acknowledgement a sequence number.

3. A method as in claim 2, wherein the upper layer removes the packet in the buffer having a sequence number equal to the sequence number included with the local acknowledgement, and also removes all older packets in the buffer.

4. A method as in claim 1, wherein the local acknowledgment triggers special mode buffer management by the upper layer in which the step of slow release is at least temporarily discontinued and steps are performed in which packets are instead removed by the upper layer whenever a subsequent local acknowledgement is received along with a sequence number, the upper layer then removing the packet with the sequence number accompanying the local acknowledgement as well as all older packets.

5. A method as in claim 4, further comprising returning to a normal-mode buffer management upon receiving a trigger-to-normal-mode local acknowledgment.

6. A method as in claim 5, wherein the trigger-to-normal-mode local acknowledgment is identified as such by the upper layer on the basis of whether or not it includes a sequence number.

7. A method as in claim 5, wherein the trigger-to-normal-mode local acknowledgment is identified as such by the upper layer on the basis of whether or not a flag it includes is set.

8. A method as in claim 7, wherein the local acknowledgment includes a sequence number.

9. A method as in claim 8, wherein the sequence number serves as a signal to the upper layer to remove the packet with the sequence number as well as all older packets.

10. A method as in claim 7, wherein the local acknowledgment does not include a sequence number.

11. A method as in claim 5, wherein the trigger-to-normal-mode local acknowledgment is identified as such by the upper layer on the basis of whether or not it is a different type of message than the local acknowledgment triggering special mode buffer management.

12. A method as in claim 11, wherein the local acknowledgment includes a sequence number.

13. A method as in claim 12, wherein the sequence number serves as a signal to the upper layer to remove the packet with the sequence number as well as all older packets.

14. A method as in claim 11, wherein the local acknowledgment does not include a sequence number.

15. A method as in claim 4, wherein the upper layer does not remove packets from the buffer while in special mode unless the buffer is full.

16. A method as in claim 4, wherein the upper layer uses a larger buffer while in special mode.

17. A method as in claim 4, further characterized in that the local acknowledgement is included with a handover trigger message.

18. A method as in claim 1, wherein in performing the local acknowledgement the radio layer signals to the upper layer a release of the buffer to a target entity.

19. A computer program product comprising: a computer readable storage structure embodying computer program code thereon for execution by one or more computer processors in a radio access network, with said computer program code characterized in that it includes instructions for performing the method of claim 1.

20. A radio access network comprising equipment having means for performing the slow release and means for performing the local acknowledgement of the method of claim 1.

21. An apparatus of a radio access network of a wireless communication system, comprising:
an upper layer, configured to perform buffer management according to either a normal mode or a special mode, and in the normal mode the upper layer performs a slow release procedure in which it removes from a buffer it maintains the oldest packet in the buffer when the buffer is full and a new packet arrives, and does so independently of whether the oldest packet has been acknowledged by a radio layer that receives data as packets from the upper layer and prepares the packets for wireless transmission; and
the radio layer, configured to trigger the upper layer to perform buffer management according to the special mode by sending a local acknowledgment to the upper layer on the occurrence of a predetermined event.

22. An apparatus as in claim 21, wherein the radio layer is configured so that in triggering buffer management according to the special mode, the radio layer includes with the local acknowledgement a sequence number.

23. An apparatus as in claim 21, wherein the upper layer is configured so that in special mode the upper layer at least temporarily discontinues the slow release procedure and instead removes packets from the buffer whenever a subsequent local acknowledgement is received along with a sequence number, the upper layer then removing the packet with the sequence number accompanying the local acknowledgement as well as all older packets.

24. An apparatus as in claim 23, wherein the radio layer is configured to trigger the upper layer to return to normal mode by providing to the upper layer a trigger-to-normal-mode local acknowledgment.

25. An apparatus as in claim 21, wherein the upper layer is configured so that upon receiving the local acknowledgement, the upper layer releases the buffer to a target entity instead of performing buffer management according to the special mode.

26. A wireless communication system, comprising a core network, a terminal, and a radio access network in turn comprising an apparatus according to claim 21, and communicatively coupling the terminal to the core network.

27. An apparatus, comprising:
an upper layer of a communication protocol for wireless communication of packets, configured to perform a slow release in which the upper layer removes from a buffer maintained by the upper layer the oldest packet in the buffer when the buffer is full and a new packet arrives, and does so independently of whether the oldest packet has been acknowledged by a radio layer that receives data as packets from the upper layer and prepares the packets for wireless transmission; and
the radio layer, configured to perform a local acknowledgement in which the radio layer sends a local acknowledgement to the upper layer on the occurrence of a predetermined event, the local acknowledgement indicating to the upper layer that the radio layer has received from a peer radio layer an acknowledgement that a packet has been successfully transmitted.

28. A method, comprising:
an upper layer of a communication protocol for wireless communication of packets performing buffer management according to either a normal mode or a special mode, and in the normal mode the upper layer performs a slow release procedure in which it removes from a buffer it maintains the oldest packet in the buffer when the buffer is full and a new packet arrives, and does so independently of whether the oldest packet has been acknowledged by a radio layer that receives data as packets from the upper layer and prepares the packets for wireless transmission; and
the radio layer triggering the upper layer to perform buffer management according to the special mode by sending a local acknowledgment to the upper layer on the occurrence of a predetermined event.

* * * * *